United States Patent
Kleidon

(10) Patent No.: US 12,300,438 B2
(45) Date of Patent: May 13, 2025

(54) SYSTEMS AND METHODS FOR STORING ELECTRICAL ENERGY

(71) Applicant: Ojai Energetics PBC, Ojai, CA (US)

(72) Inventor: William Kleidon, Ojai, CA (US)

(73) Assignee: Ojai Energetics PBC, Ojai, CA (US)

( * ) Notice: Subject to any disclaimer, the term of this patent is extended or adjusted under 35 U.S.C. 154(b) by 0 days.

(21) Appl. No.: 16/585,627

(22) Filed: Sep. 27, 2019

(65) Prior Publication Data

US 2020/0098520 A1 Mar. 26, 2020

Related U.S. Application Data

(63) Continuation of application No. PCT/US2018/024939, filed on Mar. 28, 2018.

(60) Provisional application No. 62/540,147, filed on Aug. 2, 2017, provisional application No. 62/478,553, filed on Mar. 29, 2017.

(51) Int. Cl.
| | |
|---|---|
| *H01G 4/16* | (2006.01) |
| *H01G 11/34* | (2013.01) |
| *H01G 11/40* | (2013.01) |
| *H01G 11/44* | (2013.01) |

(52) U.S. Cl.
CPC ............. *H01G 4/16* (2013.01); *H01G 11/34* (2013.01); *H01G 11/40* (2013.01); *H01G 11/44* (2013.01)

(58) Field of Classification Search
CPC .......... H01G 4/16; H01G 11/44; H01G 11/40; H01G 11/34
See application file for complete search history.

(56) References Cited

U.S. PATENT DOCUMENTS

| | | | |
|---|---|---|---|
| 6,841,231 B1 | 1/2005 | Liang et al. | |
| 9,478,365 B2 * | 10/2016 | Mitlin | ............... C01B 32/19 |
| 2003/0112581 A1 * | 6/2003 | Kwon | ............... H01G 11/78 |
| | | | 361/502 |

(Continued)

FOREIGN PATENT DOCUMENTS

| | | |
|---|---|---|
| CN | 1626731 A | 6/2005 |
| CN | 100412270 C | 8/2008 |

(Continued)

OTHER PUBLICATIONS

Sun et al., Hemp-derived activated carbons for supercapacitor, Jul. 2016, Carbon, vol. 103, pp. 181-192 (Year: 2016).*

(Continued)

*Primary Examiner* — David M Sinclair
(74) *Attorney, Agent, or Firm* — Greenberg Traurig, LLP

(57) ABSTRACT

The present disclosure provides capacitors for storing electrical energy. The capacitors can comprise, at least in part, bast fiber, bast powder, hurd fiber, hurd powder, or a derivative thereof. In some instances, a dielectric of a capacitor can be formed of bast fiber, bast powder, hurd fiber, hurd powder, or a derivative thereof. In other instances, one or both electrodes of the capacitor can be formed of bast fiber, bast powder, hurd fiber, hurd powder, or a derivative thereof. The resulting capacitors can be configured to have various power densities and various energy densities over various minimum numbers of charge/discharge cycles at a certain specified range of operating temperatures.

16 Claims, 3 Drawing Sheets

(56) References Cited

U.S. PATENT DOCUMENTS

| | | | |
|---|---|---|---|
| 2005/0208383 A1* | 9/2005 | Totsuka | H01M 50/411 429/247 |
| 2011/0051320 A1* | 3/2011 | Miller | H01M 8/0228 361/523 |
| 2011/0075323 A1* | 3/2011 | Kawakami | H01G 11/70 361/503 |
| 2012/0137937 A1* | 6/2012 | Dummett | B29C 48/53 108/57.17 |
| 2012/0156545 A1 | 6/2012 | Holme et al. | |
| 2012/0170232 A1 | 7/2012 | Bhattacharya et al. | |
| 2013/0344396 A1* | 12/2013 | Bosnyak | H01M 50/44 252/62.2 |
| 2014/0328006 A1* | 11/2014 | Mitlin | C01B 32/30 428/220 |
| 2015/0077066 A1 | 3/2015 | Stuart et al. | |
| 2015/0249362 A1* | 9/2015 | Bridgelall | B64C 1/00 320/137 |
| 2018/0366275 A1* | 12/2018 | Fukuoka | H01M 50/394 |

FOREIGN PATENT DOCUMENTS

| | | | | |
|---|---|---|---|---|
| CN | 102505187 | A | | 6/2012 |
| CN | 102511203 | A | | 6/2012 |
| CN | 105190953 | A | | 12/2015 |
| JP | H01268109 | A | | 10/1989 |
| JP | 09045586 | A | * | 2/1997 |
| JP | 09063560 | A | * | 3/1997 |
| JP | H1186825 | A | | 3/1999 |
| JP | 2000173862 | A | * | 6/2000 |
| JP | 2004103726 | A | * | 4/2004 |
| JP | 2005302341 | A | | 10/2005 |
| JP | 2014523841 | A | | 9/2014 |
| JP | 2015520914 | A | | 7/2015 |
| JP | 2016001663 | A | | 1/2016 |
| WO | WO-2011036617 | A1 | | 3/2011 |
| WO | WO-2012170749 | A2 | | 12/2012 |
| WO | WO-2013009772 | A1 | | 1/2013 |
| WO | WO-2013163695 | A1 | | 11/2013 |
| WO | WO-2014138242 | A1 | | 9/2014 |
| WO | WO-2016123272 | A1 | * | 8/2016 ............. H01G 11/06 |
| WO | WO-2016159359 | A1 | | 10/2016 |
| WO | WO-2018183564 | A1 | | 10/2018 |

OTHER PUBLICATIONS

Marta Sevilla and Antonio B. Fuertes, Direct Synthesis of Highly Porous Interconnected Carbon Nanosheets and Their Application as High-Performance Supercapacitors, ACS Nano 2014 8 (5), 5069-5078; DOI: 10.1021/nn501124h (Year: 2014).*

Cai, et al. Flexible, weavable and efficient microsupercapacitor wires based on polyaniline composite fibers incorporated with aligned carbon nanotubes. J. Mater. Chem. A. 2013. 1. 258-261. DOI: 10.1039/c2ta00274d.

Downs, D. World's First Hemp Airplane under Construction. Smell the Truth. Mar. 21, 2015. Available at https://blog.sfgate.com/smellthetruth/2015/03/21/worlds-first-hemp-airplane-under-construction/. Accessed on Dec. 20, 2016.

Luleva, M. Scientists Turn Hemp Into Cheap Pseudo-Graphene for Supercapacitors. The Green Optimistic. Aug. 14, 2014. Available at https://www.greenoptimistic.com/scientists-turn-hemp-pseudo-graphene-supercapacitors-20140814/. Accessed on Dec. 20, 2016.

Mint Press News Desk. Turning Hemp Fibers Into Batteries: Another Way Hemp Could Save Our Planet. Mint Press. Feb. 28, 2015. Available at https://www.mintpressnews.com/turning-hemp-fibers-into-batteries-another-way-hemp-could-save-our-planet/202644/. Accessed on Dec. 20, 2016.

Mosley, C. Hemp Holds Promise as Supercapacitor: Hemp Nanosheets Might Even Outdo Graphene. Industry Tap. Jan. 8, 2015. Available at http://www.industrytap.com/hemp-holds-promise-supercapacitor-hemp-nanosheets-might-even-outdo-graphene/25578. Accessed on Dec. 20, 2016.

PCT/US2018/024939 International Search Report and Written Opinion dated Jun. 15, 2018.

Samzenpus. Hemp Fibers Make Better Supercapacitors Than Graphene. Slashdot. Aug. 14, 2014. Available at https://science.slashdot.org/story/14/08/14/2226248/hemp-fibers-make-better-supercapacitors-than-graphene. Accessed on Dec. 20, 2016.

Short, A. M. Cannabis-Based Batteries Could Charge Your Phone in Seconds—And Change the Way We Store Energy. Alternet.org. Aug. 13, 2014. Available at https://www.alternet.org/2014/08/cannabis-based-batteries-could-charge-your-phone-seconds-and-change-way-we-store-energy/. Accessed on Dec. 20, 2016.

Wang, et al. Interconnected carbon nanosheets derived from hemp for ultrafast supercapacitors with high energy. ACS Nano. Jun. 25, 2013. 7(6):5131-5141. doi: 10.1021/nn400731g. Epub May 9, 2013.

Yi, et al. Fluid dynamics: An emerging route for the scalable production of graphene in the last five years. RSC Advances. 2016. 6. 72525-72536. DOI: 10.1039/C6RA15269D.

European search report and opinion dated Jan. 13, 2021 for EP Application No. 18775321.5.

Ando, Tsuneya, The electronic properties of graphene and carbon nanotubes, NPG Asia Materials, vol. 1, Oct. 2009, Tokyo Institute of Technology, Japan, pp. 17-21.

* cited by examiner

SYSTEMS AND METHODS FOR STORING ELECTRICAL ENERGY

CROSS-REFERENCE

This application claims priority to International Patent Application No. PCT/US18/24939, filed Mar. 28, 2018, which claims the benefit of U.S. Provisional Patent Application No. 62/478,553, filed Mar. 29, 2017, and U.S. Provisional Patent Application No. 62/540,147, filed Aug. 2, 2017, each of which is entirely incorporated herein by reference.

BACKGROUND

Capacitors are energy storage systems that may comprise higher power densities and are thus capable of releasing energy in shorter periods of time than some alternative energy storage systems (e.g., batteries). Supercapacitors can be configured to store an amount of charge (and thereby electrical energy) that is several orders of magnitude greater than that is stored by ordinary capacitors while still comprising higher power densities. In some cases, material properties of the capacitors and supercapacitors, such as materials for the electrodes and dielectric of the capacitors and supercapacitors, can affect capacitor performance. For example, in some cases, electrodes with larger surface area can perform than electrodes with less surface area. In another example, in some cases, dielectrics with a higher relative permittivity can perform than dielectrics with lower relative permittivity.

SUMMARY

Provided are capacitors for storing electrical energy, wherein the capacitors comprise, at least in part, bast and/or hurd, or a derivative thereof. For example, the capacitors may comprise bast fiber, bast powder, hurd fiber, hurd powder, or a derivative thereof. In some embodiments, a dielectric of a capacitor can be formed of bast fiber, bast powder, hurd fiber, hurd powder, and/or a derivative thereof. In some embodiments, one or both electrodes of the capacitor can be formed of bast fiber, bast powder, hurd fiber, hurd powder, and/or a derivative thereof. The resulting capacitors can be configured to have various power densities and various energy densities and be capable of withstanding various minimum numbers of charge/discharge cycles at a certain specified range of operating temperatures.

In an aspect, a capacitor for storing electrical energy is provided, wherein a dielectric of the capacitor is formed of bast or hurd material, or a derivative thereof. The capacitor may comprise a first electrode formed of a material capable of conducting electrons to or from an electrical load, a dielectric adjacent to the first electrode, wherein the dielectric is formed of bast fiber, bast powder, or a derivative thereof, and a second electrode adjacent to the dielectric, wherein the second electrode is formed of material that is capable of conducting electrons to or from the electrical load, and wherein the second electrode is electrically isolated from the first electrode.

Electrical energy can be stored in the capacitor comprising the dielectric formed of bast or hurd material, or a derivative thereof, by activating the capacitor, bringing the capacitor in electrical communication with the electrical load, and charging or discharging the capacitor via the electrical load.

In some embodiments, at a temperature from 60° C.-100° C., the capacitor can have a power density of at least about 55 kilowatts (kW)/kilograms (kg) active mass, 75 kW/kg active mass, or 100 kW/kg active mass over at least about 250/discharge cycles via the electrical load.

In some embodiments, at a temperature from 60° C.-100° C., the capacitor can have a power density of at least about 55 kW/kg active mass over at least about 250 charge/discharge cycles, 500 charge/discharge cycles, 1000 charge/discharge cycles, or 2000 charge/discharge cycles via the electrical load.

In some embodiments, at a temperature from 60° C.-100° C., the capacitor can have an energy density of at least about 40 watt hour (Wh)/kg active mass or 60 Wh/kg active mass over at least about 250 charge/discharge cycles via the electrical load.

In some embodiments, the electrical load to or from which the electrodes of the capacitor conduct electrons can be a power grid. Alternatively, the electrical load can comprise an electrical circuit of a vehicle, an airplane, a train, or a boat.

In some embodiments, the dielectric of the capacitor can be formed of bast material, such as hemp bast or kenaf bast. The bast material may be in the form of bast fiber, bast powder, or a derivative thereof. In some embodiments, the dielectric can comprise hurd (or skive) material, such as hemp hurd or kenaf hurd. The hurd material may be in the form of hurd fiber or hurd powder.

In some embodiments, the capacitor can have a mass of at most about 2 kg or 5 kg.

In another aspect, provided is a capacitor for storing electrical energy, wherein a first electrode, a second electrode, or both the first and second electrodes, of the capacitor are formed of bast or hurd material, or a derivative thereof. The capacitor may comprise a first electrode formed of a material capable of conducting electrons to or from an electrical load, a dielectric adjacent to the first electrode, wherein the dielectric is formed of a material that has lower electrical conductivity than the material of the first electrode, and a second electrode adjacent to the dielectric, wherein the second electrode is formed of material that is capable of conducting electrons to or from an electrical load, and wherein the second electrode is electrically isolated from the first electrode, and wherein the first electrode, the second electrode, or both the first electrode and the second electrode, is formed of bast or hurd material, or a derivative thereof.

Electrical energy can be stored in the capacitor comprising the first and/or second electrode formed of bast or hurd material, or a derivative thereof by activating the capacitor, bringing the capacitor in electrical communication with the electrical load, and charging or discharging the capacitor via the electrical load.

In some embodiments, at a temperature from 60° C.-100° C., the capacitor can have a power density of at least about 55 kilowatts (kW)/kilograms (kg) active mass, 75 kW/kg active mass, or 100 kW/kg active mass over at least about 250/discharge cycles via the electrical load.

In some embodiments, at a temperature from 60° C.-100° C., the capacitor can have a power density of at least about 55 kW/kg active mass over at least about 250 charge/discharge cycles, 500 charge/discharge cycles, 1000 charge/discharge cycles, or 2000 charge/discharge cycles via the electrical load.

In some embodiments, at a temperature from 60° C.-100° C., the capacitor can have an energy density of at least about 40 Wh/kg active mass or 60 Wh/kg active mass over at least about 250 charge/discharge cycles via the electrical load.

In some embodiments, the electrical load to or from which the electrodes of the capacitor conduct electrons can be a power grid. Alternatively, the electrical load can comprise an electrical circuit of a vehicle, an airplane, a train, or a boat.

In some embodiments, the first and/or second electrode of the capacitor can be formed of bast material, such as hemp bast or kenaf bast. The bast material may be in the form of bast fiber, bast powder, or a derivative thereof. In some embodiments, the first and/or second electrode can comprise hurd (or shive) material, such as hemp hurd or kenaf hurd. The hurd material may be in the form of hurd fiber or hurd powder.

In some embodiments, the capacitor can have a mass of at most about 2 kg or 5 kg.

In another aspect, provided is a method of manufacturing a capacitor, comprising: (a) obtaining bast and/or hurd material derived from a plant; (b) processing the bast and/or hurd material into processed material, which processed material is in fibrous or particle form; (c) using the processed material to generate a first electrode, a second electrode and/or a dielectric; and (d) assembling the first electrode, second electrode and the dielectric to yield the capacitor comprising (i) the first electrode, (ii) the dielectric adjacent to the first electrode, and (iii) the second electrode adjacent to the dielectric, wherein the second electrode is electrically isolated from the first electrode, and wherein the capacitor has a power density of at least about 55 kilowatts (kW)/kilograms (kg) active mass at a temperature from 60° C.-100° C. over at least about 250 charge/discharge cycles via the electrical load.

In some embodiments, the plant is cannabis.

In some embodiments, the processing comprises pulverizing the bast and/or hurd material to form particles comprising the bast and/or hurd material.

In some embodiments, the bast and/or hurd material comprises bast and/or hurd fiber. In some embodiments, the bast and/or hurd material is bast material. In some embodiments, the bast and/or hurd material is hurd material.

In some embodiments, the method further comprises weaving the capacitor into a fabric.

In some embodiments, the capacitor has a power density of at least about 75 kW/kg active mass at the temperature from 60° C.-100° C. over at least about 250 charge/discharge cycles via the electrical load. In some embodiments, the capacitor has a power density of at least about 100 kW/kg active mass at the temperature from 60° C.-100° C. over at least about 250 charge/discharge cycles via the electrical load. In some embodiments, the capacitor has a power density of at least about 55 kW/kg active mass at the temperature from 60° C.-100° C. over at least about 500 charge/discharge cycles via the electrical load. In some embodiments, the capacitor has a power density of at least about 55 kW/kg active mass at the temperature from 60° C.-100° C. over at least about 1000 charge/discharge cycles via the electrical load. In some embodiments, the capacitor has a power density of at least about 55 kW/kg active mass at the temperature from 60° C.-100° C. over at least about 2000 charge/discharge cycles via the electrical load.

In some embodiments, the electrical load is a power grid. In some embodiments, the electrical load comprises an electrical circuit of a vehicle.

In some embodiments, the capacitor has a mass of at most about 5 kg. In some embodiments, the capacitor has a mass of at most about 2 kg.

In some embodiments, the capacitor has an energy density of at least about 40 W hours (h)/kg active mass at a temperature from 60° C.-100° C. over at least about 250 charge/discharge cycles via the electrical load. In some embodiments, the capacitor has an energy density of at least about 60 W h/kg active mass at a temperature from 60° C.-100° C. over at least about 250 charge/discharge cycles via the electrical load.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
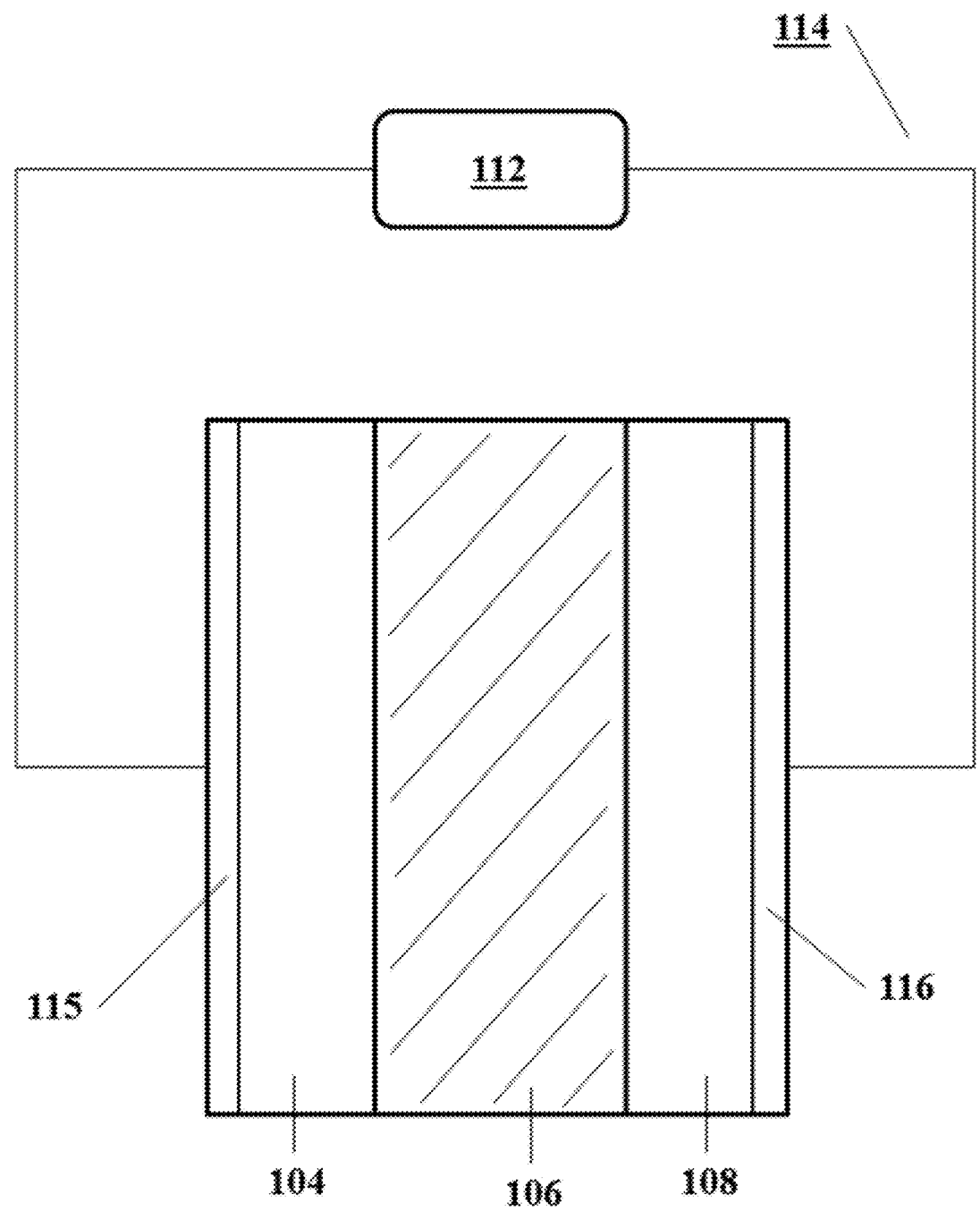
FIG. 1 shows a schematic diagram of a capacitor or a supercapacitor.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "bast fiber," as used herein, generally refers to natural (e.g., plant) fiber and/or other material collected from the phloem (the "inner bark", sometimes called "skin") or bast surrounding the stem of certain dicotyledonous plants. Such plants may include cannabis plants, for example. Bast fiber may be obtained from herbs cultivated in agriculture, such as, for instance, flax, hemp, jute, sisal, kenaf, or ramie. Bast fiber may be obtained from wild plants, such as stinging nettle, and trees, such as lime, linden, wisteria, or mulberry. Bast fiber may be obtained from such natural material through, for example, retting or otherwise extracting from the interior xylem or epidermis (e.g., bark surface) of a plant.

For example, a retting (e.g., water retting, dew retting, chemical retting, etc.) process can remove adhesive (pectinous) substances from the bast fibers to allow for their isolation. In certain instances, bast fiber may be obtained via decortication or the manual or mechanical peeling from the plant. In some instances, after extraction of bast fiber (e.g., via peeling), the stalk, stem, or core of the plant, such as hurds or shives, may be obtained.

The term "bast powder," as used herein, generally refers to powdered bast fiber and/or a powder of the phloem or bast surrounding the stem of certain dicotyledonous plants. In some cases, the bast powder can comprise particles in the nanometer or micrometer range. The particles may be cellulose particles, such as microcrystalline cellulose (MCC) and nanocrystalline cellulose (NCC), derived from bast or bast fiber. In some cases, the MCC and NCC may be isolated and/or derived from the bast or bast fiber via acid hydrolysis (e.g., hydrocholoric acid hydrolysis). The bast powder may comprise nanoparticles and/or microparticles. The bast powder can be hemp bast powder, kenaf bast powder, sisal bast powder, and/or jute bast powder.

The term "hurd fiber" or "shive fiber," as used herein, generally refers to natural (e.g., plant) fiber and/or other material collected from the stalk, stem, or core of certain dicotyledonous plants. Such plants may include cannabis plants, for example. Hurd fiber may be obtained from herbs cultivated in agriculture, such as, for instance, flax, hemp, jute, sisal, kenaf, or ramie. Hurd fiber may be obtained from wild plants, such as stinging nettle, and trees, such as lime, linden, wisteria, or mulberry. Hurd fiber may be obtained from such natural material through, for example, retting or otherwise extracting the bast from the interior xylem or epidermis (e.g., bark surface) of a plant, and harvesting the inner stalk, stem, or core of the plant. In certain instances, hurd fiber may be obtained via decortication or the manual or mechanical peeling of the bast from the plant. In some instances, after extraction of bast fiber (e.g., via peeling), the stalk, stem, or core of the plant, such as hurds or shives, may be obtained.

The term "hurd powder," as used herein, generally refers to generally refers to powdered hurd fiber and/or a powder of the stem, stalk, or core of certain dicotyledonous plants. In some cases, the hurd powder can comprise particles in the nanometer or micrometer range. The particles may be cellulose particles, derived from hurd or hurd fiber. The hurd powder may comprise nanoparticles and/or microparticles.

Capacitors are a type of energy storage system that may comprise higher power densities and are thus capable of releasing energy in shorter periods of time than some alternative energy storage systems (e.g., batteries). Supercapacitors, also known as electric double layer capacitors, electrochemical capacitors, or ultracapacitors, can be configured to store an amount of charge (and thereby electrical energy) that is several orders of magnitude greater than that is stored by ordinary capacitors while still comprising high power densities. Capacitors have a wide array of uses and can be configured to power electrical applications that require short but powerful bursts of energy (e.g., starting an engine, rapid acceleration, stabilizing signals, etc.).

A capacitor may comprise two electrodes isolated from each other by a separating material. The separating material can be a dielectric, or, in the case of supercapacitors, a separator soaked in an electrolyte. The performance of capacitors and/or supercapacitors can be significantly enhanced or diminished depending on the respective material selected for the individual components of the capacitor such as the electrode material and the dielectric material.

Provided are capacitors that comprise, at least in part, a natural derivative. In some instances, the natural derivative may be bast fiber, bast powder or a derivative thereof. In some instances, the natural derivative may comprise derivatives from the stalk, stem, and/or core of herbs or plants (e.g., flax, hemp, jute, sisal, kenaf, or ramie) or plants. For example, the derivatives may include hurds, hurd fiber, hurd powder, shives, shive fiber, or shive powder from hemp or flax. For example, a dielectric of a capacitor can be formed of bast fiber, bast powder, hemp hurd, or a derivative thereof. In another example, one or both electrodes of the capacitor can be formed of bast fiber, bast powder, hemp hurd, or a derivative thereof. Such capacitors can be configured to have various power densities and various energy densities at a specified range of operating temperatures. The capacitors may be capable of enduring repeated charge/discharge cycles at the specified range of operating temperatures. Capacitors of the present disclosure may be supercapacitors.

Capacitors of the present disclosure may be capable of substantially high energy densities (e.g., at least about 40, 50, or 60 Wh/kg) and substantially high power densities (e.g., at least about 20, 40 or 60 kW/kg). These capacitors may have various uses, such as continuous or intermittent supply of energy in buildings, vehicles (e.g., cars, trucks, trains, jets), or electronics. The capacitors may be transportable.

Reference will now be made to the figures. It will be appreciated that the figures and features therein are not necessarily drawn to scale.

FIG. 1 shows a schematic diagram of a capacitor. Such capacitor may be a supercapacitor. The capacitor can store electrical energy by allowing an electric potential to accumulate between two conducting electrodes and at least one non-conductive dielectric therebetween. The illustrated capacitor includes a first electrode 104, a dielectric 106, and a second electrode 108. The dielectric 106 can comprise an insulating material. The dielectric 106 can comprise a material that is less conductive than either of the two electrodes. The two electrodes 104,108 can each be capable of conducting electrons.

Although a single dielectric 106 is shown, the capacitor may include a plurality of dielectrics, such as at least 2, 3, 4, 5, 6, 7, 8, 9, 10, 20, 30, 40, 50, or greater dielectrics. The dielectrics may be disposed adjacent one another as separate layers. The dielectrics may have uniform profiles or may have non-uniform profiles. For example, the dielectrics may have substantially flat boundaries or curved boundaries. The dielectrics may comprise the same material or different materials.

The first electrode 104 can comprise a first conductive material that is in electronic communication with a circuit 114 via a first terminal 115. The first terminal 115 can be a separate conductive component (e.g., metal plate) from the first conductive material 104 or be a connection point of the first electrode 104 to and/or from the circuit 114. The second electrode 108 can comprise a second conductive material that is in electronic communication with the common circuit 114 via a second terminal 116. The second terminal 116 can be a separate conductive component from the second conductive material 108 or be a connection point of the second conductive material 108 to and/or from the circuit 114.

In some instances, each electrode 104, 108 can comprise one or more adjoining layers of a conductive material. In some instances, the dielectric 106 can comprise one or more adjoining layers of an insulating material (e.g., glass, air, ceramic, etc.). The first electrode 104 and the second electrode 108 can comprise the same material or different materials.

The capacitance of the capacitor can depend on a variety of factors such as, among other factors, a distance between the two electrodes 104, 108, surface areas of the respective conducting electrodes, and permittivity of the dielectric. For example, capacitance can increase as the distance between the two electrodes decreases and/or the surface area of the respective conducting electrodes increases.

The capacitor may be charged or discharged by applying an electric load 112 to the capacitor. For example, the capacitor can be charged when a voltage is applied to the capacitor via another energy storage or power providing system (e.g., power terminal, battery, etc.). The flow of current can be interrupted by the non-conductive dielectric and as a result opposite charges can build up on the two electrodes of the capacitor. An electric potential can be created, and subsequently stored, across the dielectric between the two electrodes. In another example, the capacitor can be discharged by bringing an electrical load 112 that consumes electrical power into electrical communication with the capacitor. The electric potential on the electrodes can be discharged via the electrical load 112.

Supercapacitors, also known as electric double layer capacitors, electrochemical capacitors, or ultracapacitors, can be configured to store an amount of charge (and thereby electrical energy) that is several orders of magnitude greater than that is stored by ordinary capacitors. Capacitors of the present disclosure may store charge at an amount that is at least about 1.1, 1.2, 1.3, 1.4, 1.5, 2, 3, 4, 5, 6, 7, 8, 9, 10, 20, 30, 40, 50, 60, 70, 80, 90, 100, 200, 300, 400, 500, 1000, or 10000 times greater than a typical capacitor. A supercapacitor may store electrical energy by allowing an electrical potential to accumulate between two conducting electrodes 104, 108 across a dielectric 106, or dielectric equivalent, wherein each of the two conducting electrodes 104, 108 is isolated from the other by the dielectric 106 positioned therebetween.

The dielectric 106 can comprise an electrolyte and/or a separator. For example, the two electrodes 104, 108 and the separator can be soaked in an electrolyte. The first electrode 104 and the second electrode 108 can be in ionic communication with each other such that when the supercapacitor is charged, opposite charges, via ions moving through the electrolyte, can form on either side of the dielectric separator between the dielectric separator and each electrode. Unlike in batteries, the electrodes do not chemically react with the electrolyte. As a result, two pairs of opposite charge layers can store electric potential.

The two electrodes can each be capable of conducting electrons. The first electrode 104 of the supercapacitor can comprise a first conductive material that is in electronic communication with a circuit 114 via a first terminal 115. The first terminal 115 can be a separate conductive component from the first conductive material or be a connection point of the first electrode 104 to and/or from the circuit 114. For example, the first conductive material may be formed of a porous conductive material (e.g., activated charcoal, graphene, carbon nanotubes, carbon black, etc.) that is in communication with the circuit 114 via the first terminal 115. Porous conductive material may beneficially increase real surface area of the electrode to store charge (e.g., ions) and thereby increase capacitance of the capacitor (e.g., supercapacitor). Similarly, a second electrode 108 of the supercapacitor can comprise a second conductive material that is in electronic communication with the common circuit 114 via a second terminal 116. The second terminal 116 can be a separate conductive component from the second conductive material or be a connection point of the second electrode 108 to and/or from the circuit 114. For example, the second conductive material may also be formed of a porous conductive material that is in communication with the circuit 114 via the second terminal 116.

Different materials can be selected to form the electrodes and/or the dielectric of the capacitor to change the capacitor's performance capacities, such as power density and energy density. In some instances, desired performance capacities must be weighed against other considerations such as operable temperature range, thermal stability (e.g., flammability), structural stability, durability, toxicity, environmental impact, dimensional limitations (e.g., size, weight, etc.), economics of manufacturing, and/or a combination thereof.

In some instances, pairing different materials within the capacitor, such as using a first electrolyte composition (e.g., a first salt and a first solvent, etc.) in combination with electrodes made of a second material (e.g., activated carbon) may produce different results. For example, a larger electrode surface area can generally increase capacitance. However, when the electrode comprises a porous structure, transportability of ions (in the electrolyte) through or between the porous structure of the electrode can affect the effectiveness of the larger available surface area. For instance, an ion in a particular electrolyte composition may be too small or too large to effectively interface with the surface of the porous structure.

Materials comprising relatively optimal structure to be used as capacitor electrodes, such as graphene (e.g., activated graphene, curved graphene, laser-scribed graphene, ultrathin planar graphene, sponge-like graphene, etc.) or other carbon micro or nanomaterials comprising large and flat adsorption surfaces and high in-plane electrical conductivity, can be expensive to manufacture compared to other alternatives. For example, graphene-like materials can be synthesized using relatively cost heavy methods such as exfoliation (e.g., modified Hummers method), chemical vapor deposition, or microwave synthesis. In contrast, carbons derived from petroleum or biowaste can be synthesized through pyrolysis or hydrothermal methods.

In some instances, biomass, such as bast fiber material, bast powder material, or hemp hurd material (e.g., fiber or powder), can be used as precursors to manufacture components of capacitors of the present disclosure, such as, for example, graphene-like carbon nanosheet structures (e.g., carbon sheets having dimensions from 1 nanometer to at most 1000 nanometers or 500 nanometers) using conventional processes, such as hydrothermal synthesis. Such precursors may be formed in the form of sheets, tubes, or rolls, for example. The bast fiber, bast powder, hemp hurd, or a derivative thereof may be the active material for one or more components of the capacitors (e.g., electrodes).

For example, bast fiber and/or hurd fiber can first undergo hydrothermal carbonization to break up an initially yarn like structure of the fiber into smaller pieces. The hydrothermal synthesis process can yield high oxygen content (e.g., oxygen-containing functional groups), making the yield susceptible to a subsequent activation process using activating reagents such as potassium hydroxide (KOH). After the hydrothermal process, the fiber can then be activated with, e.g., KOH, to penetrate the fiber and generate carbon nanosheets. The activation temperature can be at least about 600 degrees Celsius (C.), 650° C., 700° C., 705° C., 710° C., 715° C., 720° C., 725° C., 730° C., 735° C., 740° C., 745°

C., 750° C., 755° C., 760° C., 765° C., 770° C., 775° C., 780° C., 785° C., 790° C., 795° C., 800° C. or higher. As an alternative, the activation temperature can be less than or equal to about 800° C., 790° C., 780° C., 770° C., 760° C., 750° C., 740° C., 730° C., 720° C., 710° C., 700° C., 650° C., 600° C. or lower. The bast fiber and/or hurd fiber may or may not be pretreated, such as to reduce the size or open up the fiber structure.

The hydrothermal carbonization process may generate graphite flakes. The graphite flakes can have a diameter of at least about 10 micrometers (μm), 50 μm, 100 μm, 200 μm, 300 μm, 400 μm, 500 μm or more. As an alternative, the diameter of the graphite flakes can be less than or equal to about 500 μm, 400 μm, 300 μm, 200 μm, 100 μm, 50 μm, 10 μm or smaller. The graphite flakes can have a thickness of at least about 0.1 μm, 1 μm, 10 μm, 20 μm, 40 μm, 80 μm, 100 μm, 120 μm, 150 μm or greater. As an alternative, the thickness of the graphite flakes can be less than or equal to about 150 μm, 120 μm, 100 μm, 80 μm, 40 μm, 20 μm, 10 μm, 1 μm, 0.1 μm or smaller. Alternatively or in addition to, the hydrothermal carbonization of the bast fiber, bast powder, hurd fiber, or hurd powder material may generate at least one stack of carbon nanosheets.

The graphite flakes or the at least one stack of carbon nanosheets from the hydrothermal carbonization process may be treated with one or more exfoliation techniques to generate at least one carbon nanosheet having a thickness of one carbon atom. The exfoliation techniques can have high scalability, reproducibility, processability, and/or low production cost. The one or more exfoliation techniques may utilize liquid phase exfoliation (LPE) devices based on fluid dynamics. Suitable solvents for the LPE devices may be organic solvents (e.g. N,N-dimethylformamide), surfactant/water solutions, aromatic solvents, or ionic liquids. The LPE devices may use the fluid dynamics to subject the graphite flakes or the at least one stack of carbon nanosheets, dispersed in one or a mixture of the suitable solvents, under intensive shear forces. The intensive shear forces may be sufficient to exfoliate, or peel off, the at least one carbon nanosheet from the at least one stack of carbon nanosheets. The LPE devices that utilize the fluid dynamics may be a vortex fluidic device, a pressure-driven fluid dynamics device, or a rotary mixer-driven fluid dynamics device. An operational speed of the vortex fluidic device may be at least about 10 rotations per minute (r.p.m.), 100 r.p.m., 1,000 r.p.m., or 10,000 r.p.m. or higher. Alternatively, the operational speed may be less than or equal to about 10,000 r.p.m., 1,000 r.p.m., 100 r.p.m., 10 r.p.m. or lower. A pressure of the pressure driven fluid dynamics device may be at least about 1 megapascal (MPa), 5 MPa, 10 MPa, 20 MPa, 30 MPa, 40 MPa, 50 MPa, 100 MPa or higher. Alternatively, the pressure may be less than or equal to 100 MPa, 50 MPa, 40 MPa, 30 MPa, 20 MPa, 10 MPa, 5 MPa or lower. A rotor speed of the rotary mixer-driven fluid dynamics device may be at least about 10 r.p.m., 100 r.p.m., 1,000 r.p.m., or 10,000 r.p.m. or higher. Alternatively, the rotor speed may be less than or equal to about 10,000 r.p.m., 1,000 r.p.m., 100 r.p.m., 10 r.p.m. or lower.

In another example, bast or hurd powder can comprise micron-sized or nano-sized cellulose particles, such as microcrystalline cellulose (MCC), nanocrystalline cellulose (NCC), or cellulose nanocrystal (CNC), derived from bast or hurd. The powder may comprise nanoparticles and/or microparticles. In some cases, the MCC, NCC, and CNC may be isolated and/or derived from the bast or hurd via acid hydrolysis (e.g., hydrocholoric acid hydrolysis). For example, bast or hurd fiber, after harvesting, can be dried to less than 10% moisture content (e.g., in an industrial oven) and ground (e.g., via a cutting mill pulverizer) to yield bast or hurd powder (e.g., hemp bast powder, kenaf bast powder, hemp hurd powder, etc.). The powder can undergo alkali treatment and washing. In some cases, the alkali treatment and washing can comprise treatment with 4% (w/w) sodium hydroxide (NaOH) solution at 80° C. for about 2 hours, washing with distilled water, and filtering. The alkali treatment and washing can be repeated (e.g., 2 cycles, 3 cycles, 4 cycles, etc.). Subsequent to alkali treatment and washing, a bleaching treatment can be performed. In some cases, the bleaching treatment can comprise soaking in a solution containing equal parts of acetate buffer, aqueous chlorite 1.7% (w/w), and distilled water, washing with distilled water, and filtering. The bleaching treatment can be repeated (e.g., 2 cycles, 3 cycles, 4 cycles, etc.). The bast or hurd can then be subjected to acid hydrolysis (e.g., hydrochloric acid hydrolysis, sulfuric acid hydrolysis, etc.). In some instances, acid hydrolysis can comprise subjecting 4-6% (w/w) bleached fibers in preheated 65% sulfuric acid at 50° C. for 60 minutes, mixing the suspension (e.g., via magnetic stirrers), and separating via a centrifuge maintained at 4000 rotations per minute (rpm) for 30 minutes and dialyzed with distilled water. Whiskers suspension can be homogenized to yield bast- or hurd-derived nanocellulose whiskers. In another example, NCC or CNC (e.g., nanoparticles) can be prepared using isolated cellulose from bast or hurd, such as via acid hydrolysis (e.g., hydrochloric acid hydrolysis, sulfuric acid hydrolysis). The bast- or hurd-derived micro- or nano-powder may demonstrate properties such as high aspect rations, high surface areas, and high modulus. In some cases, the bast powder can comprise particles in the nanometer or micrometer range. For example, a bast or hurd powder particle may have a diameter of at least about 50, 60, 70, 80, 90, 100, 150, 200, 250, 300, 350, 400, 450, 500 nanometers (nm) or more. Alternatively, the bast or hurd powder particle may have a diameter of at most about 500, 450, 400, 350, 300, 250, 150, 100, 90, 80, 70, 60, 50 nm or less. Alternatively, a bast or hurd powder particle may have a diameter of at least about 10, 20, 30, 40, 50, 60, 70, 80, 90, 100, 150, 200, 250, 300, 350, 400, 450, 500 micrometers (μm) or more. Alternatively, the bast or hurd powder particle may have a diameter of at most about 500, 450, 400, 350, 300, 250, 150, 100, 90, 80, 70, 60, 50, 40, 30, 20, 10 μm or less.

In light of the above considerations, the capacitor may comprise, at least in part, bast fiber, bast powder, hemp hurd (e.g., fiber, powder, etc.), or a derivative thereof. For example, one of the two electrodes or both electrodes can comprise bast fiber, bast powder, hemp hurd, or a derivative thereof. In some instances, the bast fiber-based, bast powder-based, or hemp hurd-based electrodes can comprise carbon nanosheets or carbon nanotubes that contain high levels of mesoporosity which demonstrate favorable electrochemical properties in a conventional ionic liquid electrolyte. Alternatively or in addition, a dielectric, or at least a portion of the dielectric, can comprise bast fiber, bast powder, hemp hurd, or a derivative thereof. For example, a double-layer of NFC and CNC can be used as the dielectric in a supercapacitor. In some instances, the CNC and NFC dielectric can be deposited on each electrode by spray-coating a thin film of CNC solution (e.g., 0.8 wt % in water), drying the CNC film (e.g., at 60° C.), drop-casting NFC gel (e.g., 0.8 wt % in water), and letting the gel dry (e.g., at room temperature) for dehydration. A mechanical mask (e.g., polydimethylsiloxane (PDMS) mask) may be used during depositing.

In some instances, the capacitor may comprise, at least in part, hemp (e.g., *Cannabis sativa* L.) bast fiber, hemp bast powder, hemp hurd (fiber or powder) or a derivative thereof. Hemp fiber (e.g., bast fiber, hurd fiber, etc.) can comprise one or more layers of cellulose, semicellulose, and lignin. In particular, hemp fiber can comprise layered microfibrils consisting of crystalline cellulose fibrils. During a hydrothermal process (e.g., conducted at about 170-200° C.) of the hemp fiber, among other reactions (e.g., hydrolysis of lignin, dehydration, decomposition, condensation, etc.), the crystalline cellulose can be partially carbonized. The hydrothermal process can loosen the interconnected layers of the cellulose microfibrils while converting a majority of the semicellulose and a part of the lignin into soluble organic compounds. The semicellulose and lignin can be dissolved to isolate the loosened cellulose microfibrils.

During a subsequent activation process (e.g., conducted at about 700-800° C.), activating reagents, such as, e.g., KOH, can penetrate the loosened microfibril layers and thereby separate the layers as sheets. The KOH can further carbonize and activate the separated layers to reduce their respective thickness and generate microporosity and mesoporosity in the carbon sheet structure. In particular, the crystalline cellulose content of the hemp precursor allows derivatives forming from the KOH activation process to comprise a degree of alignment (e.g., graphitic order) in their structural properties. Alternatively, a pyrolysis process can be used to synthesize bast or hurd fiber derivatives.

A resulting derivative of the hemp fiber can comprise carbon nanosheets with favorable degrees of microporosity, mesoporosity, and graphitic alignment for use in capacitor systems. In some instances, such fiber (e.g., pure hemp) or its derivatives (e.g., graphene-like carbon nanosheets) can be used as a first conductive material (e.g., material of the first electrode 104 in FIG. 1) for a first electrode, a second conductive material (e.g., material of the second electrode 108 in FIG. 1) for a second electrode, or as conductive materials for both the first and second electrodes. A dielectric, electrolyte, and/or separator can be placed between the first and second electrodes to complete the capacitor. Alternatively, bast, hurd, or shive fiber can be obtained from flax, ramie, jute, kenaf, lime, linden, and/or other plants.

In other instances, bast fiber, bast powder, hurd, or its derivatives can be used as a dielectric material (e.g., dielectric 106 in FIG. 1). For example, cellulosic fibers or powders in bast or hurd (e.g., fiber or powder) can comprise relatively high electrical permittivity which can be advantageous for capacitor performance. In some instances, natural fibers or powders (e.g., bast fiber, bast powder, hurd fiber, hurd powder, etc.) can be mixed with synthetic fibers or powders in varying proportions to vary electrical resistance and/or electrical permittivity. In some instances, moisture content (e.g., humidity) can be altered to vary electrical resistance and/or electrical permittivity of the bast or hurd material. For example, the bast or hurd material can have a moisture content of at least about 5%, 10%, 15%, 20%, 25%, 30%, 35%, 40%, 45%, 50%, 55%, 60%, 65%, 70%, 75%, 80%, 85%, 90%, 95%, or more. As an alternative, the bast or hurd material can have a moisture content of less than or equal to about 95%, 90%, 85%, 80%, 75%, 70%, 65%, 60%, 55%, 50%, 45%, 40%, 35%, 30%, 25%, 20%, 15%, 10%, 5% or less.

In some instances, an operating temperature can be varied to vary electrical resistance and/or electrical permittivity. For example, the operating temperature can be at most about −50° C., −40° C., −30° C., −20° C., −10° C., 0° C., 10° C., 20° C., 30° C., 40° C., 50° C., 60° C., 70° C., 80° C., 90° C., 100° C., 110° C., 120° C., 130° C., 140° C., 150° C. or higher. As an alternative, the operating temperature can be less than or equal to 150° C., 140° C., 130° C., 120° C., 110° C., 100° C., 90° C., 80° C., 70° C., 60° C., 50° C., 40° C., 30° C., 20° C., 10° C., 0° C., −10° C., −20° C., −30° C., −40° C., −50° C. or lower. In some instances, the bast material can be configured to perform with varying electrical resistances and/or electrical permittivity over a range of humidity and/or a range of operating temperatures. In some instances, a thickness, surface mass, density (e.g., number of threads per unit length) and/or other configuration (e.g., warp and weft) of a weaving structure in the cellulosic fibers in bast or hurd fiber can be altered to vary electrical resistance and/or electrical permittivity.

In some instances, such bast or hurd material (e.g., pure hemp) or its derivatives (e.g., graphene-like carbon nanosheets, bast fiber reinforced polymer composites, CNC, NCC, etc.) can be used as a dielectric material (e.g., dielectric 106 in FIG. 1). For example, polymers (e.g., pure polypropylene, pure unsaturated polyester materials, etc.) can be reinforced with one or more bast or hurd fibers or powders (e.g., hemp, jute, etc.) to form hybrid fiber or powder composites that have higher dielectric constants (e.g., permittivity). A first electrode and a second electrode, each having a higher electrical conductivity than the dielectric, can each be placed adjacent to the dielectric, wherein the first and second electrodes are electrically isolated from each other.

In some instances, bast material, hurd material, or derivatives thereof can undergo processes such as electrospinning, solution casting, melt processing, and/or in-situ polymerization process to form polymer composites with desired material properties such as large surface to volume ratios. Electrospinning, for example, can control the deposition and dispersion of highly attractive nanomaterials, such as graphene, carbon nanosheets, carbon nanotubes, graphene nano-ribbons, and other carbon nanofiber composites. Through electrospinning, carbon fibers with diameters less than one micrometer (micron) can be formed with relatively high control.

An electrospinning setup can comprise a polymer solution, a high-voltage power supply, a needle (e.g., spinneret, nozzle, etc.), and an electrode collector. The high-voltage power supply can be any application unit configured to generate a strong electric field. The polymer solution may exit a container through the needle. The electrode collector may be disposed at some distance from the tip of the needle. The polymer solution and the electrode collector can be subject to a strong electric field, such as by applying the high-voltage power supply. A droplet of the polymer solution can exit the needle. When the electrical forces in the electric field overcome the surface tension of the polymer solution droplet, the droplet can elongate in a generally whip-like trajectory to form a solution jet or focused fluid stream. Under the direction of the strong electric field, the solution jet can bend or whip around to stretch thinner. Thereafter, solvent evaporation from the jet can result in dry or semidry fibers that can randomly deposit onto the electrode collector to form a nanofiber web. The electro-spun fiber diameters can be on the orders of magnitude of between about one micron to about ten nanometers. The small fiber diameter and large aspect ratio of the resultant fibers can lead to significantly high surface-to-volume ratios.

In some instances, the droplet can be subjected to a high-speed, circumferentially uniform air flow in addition to the strong electric field, such as in a gas-assisted electrospinning (GAES) system. A GAES system can provide much higher throughput of fibers, thinner fibers, and enhanced stretching of fluid jets, as well as better control of directing the fibers towards the collector with less electrical interference, for example, among neighboring or adjacent nozzles.

The input polymer solution can comprise a well-dispersed amount of fiber (e.g., bast, hurd, etc.) or its derivatives, such as graphene, carbon nanosheets, carbon nanotubes, graphene nano-ribbons, and other carbon nanofiber composites. In some instances, this polymer/dispersion solution can be prepared by making the polymer solution separately from the dispersion solution and mixing them together. The polymer/dispersion solution can be a homogenous solution. Electrospinning this polymer/dispersion solution can generate resultant nanocomposite fibers that have well-dispersed embedded nanostructures. For example, a carbon nanotube (CNT)/polymer composite that undergoes electrospinning can result in better aligned nanocomposite fibers with the CNTs orienting substantially parallel to the nanofiber axis. In some instances, a stable dispersion of CNTs can be achieved by using surfactants (e.g., sodium dodecyl sulphate), large amphiphilic polymers (e.g., polyvinyl pyrrolidone), and/or natural macromolecules (e.g., polysaccharide, Gum Arabic) which can be adsorbed onto the hydrophobic nanotubes. In some instances, dispersion can be facilitated via ultrasonification of the solution.

Beneficially, electrospun bast fiber/polymer composites (e.g., CNT/polymer composites) can demonstrate significantly improved mechanical and electrical properties that are suitable for application in capacitors and/or supercapacitors described herein. The improved dispersion and orientation of nanotubes within the polymer fiber, and strong interfacial adhesion due to the nanotube surface modification can significantly improve the tensile strength and Young's modulus of the polymers. The fiber/polymer composite may also have improved resistance to mechanical strain (e.g., fracture strain), such as due to the nanopores on the fiber surface shielding slippage and stress, as well as the highly aligned nanotubes along the fiber axis taking on the mechanical load from the polymer matrix. Furthermore, the presence of conductive natural fiber (e.g., bast fiber, hurd fiber, etc.) or fiber derivatives in the fiber/polymer composites can provide a way for the otherwise relatively less conductive polymers to improve conductivity for various applications.

Nanofiber natural fiber/polymer composites can be used as material, such as for electrodes and/or dielectrics, in capacitors or supercapacitors as described herein.

In some instances, an electrode, dielectric, and/or all of the capacitor may be produced and/or assembled via three dimensional (3D) printing where bast or hurd material (e.g., hemp, flax, etc.), fiber or powder, is input and/or output material. The 3D printing can be 3D nano-printing. For example, individual components of the capacitor may be printed layer by layer onto a desired location (e.g., panel, wing, fabric, etc.) with high modularity and flexibility.

The capacitor comprising at least in part of bast fiber, bast powder, hurd fiber, hurd powder, or a derivative thereof can have a mass of at most about 10 grams (g), 20 g, 30 g, 40 g, 50 g, 100 g, 200 g, 300 g, 400 g, 500 g, 600 g, 700 g, 800 g, 900 g, 1 kilogram (kg), 1.1 kg, 1.2 kg, 1.3 kg, 1.4 kg, 1.5 kg, 2 kg, 3 kg, 4 kg, 5 kg, 6 kg, 7 kg, 8 kg, 9 kg, 10 kg, 15 kg, 20 kg, 30 kg, or higher. In some instances, the mass of the capacitor can be tailored to satisfy the power needs of a particular type of electrical load (a power grid, a smart grid, or an electrical circuit of a vehicle, gas car, electric car, airplane, jet, train, rail car, boat, motorboat, electronic device, renewable energy harvesting and/or storage systems, etc.) electrically coupled to the capacitor.

Figure 2:
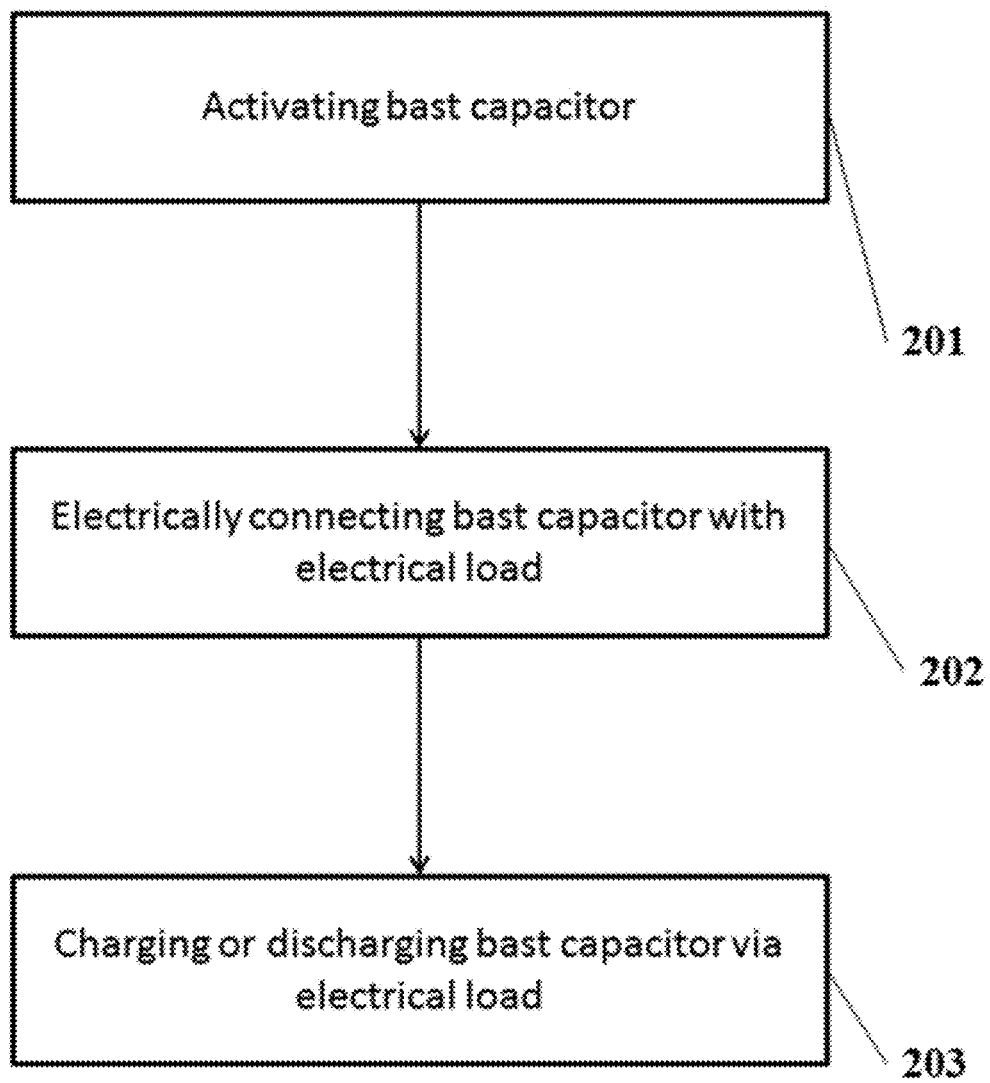
FIG. 2 illustrates a method of using bast fiber or bast powder capacitors.

FIG. 2 illustrates a method of using natural fiber or powder capacitors to store electrical energy. At a first operation 201, a capacitor comprising bast fiber, bast powder, hurd, or a derivative thereof is activated. The capacitor can comprise at least in part of bast fiber, bast powder, hurd, or a derivative thereof. In some instances, a first electrode, a second electrode, or both the first and second electrodes of the capacitor can comprise bast fiber, bast powder, hurd, or a derivative thereof. In other instances, a dielectric of the capacitor can comprise bast fiber, bast powder, hurd, or a derivative thereof. In yet some other instances, both the dielectric and one or both electrodes of the capacitor can comprise bast fiber, bast powder, hurd, or a derivative thereof. For example, a capacitor can comprise wholly of bast material (e.g., fiber, powder), bast-derived, hurd material (e.g., fiber, powder), or hurd-derived products. In some cases, one or both electrodes can comprise bast or hurd derivatives (e.g., graphene-like derivatives of hemp bast or hurd fiber) and the dielectric can comprise pure bast or hurd material (e.g., pure hemp fiber) or a mixture of bast or hurd material (e.g., with or without synthetic fibers, powders, etc.).

The first and second electrodes can be electrically isolated from each other such that no electron is directly conducted to or from the two electrodes. The dielectric can be placed adjacent to each of the first electrode and the second electrode, and between the two electrodes. In some instances, for supercapacitors, the dielectric can comprise an electrolyte and/or separator soaked in the electrolyte. The first and second electrodes can each be in contact with the electrolyte and configured to not chemically react with the electrolyte. For example, a plurality of ions present in the electrolyte can collect on an electrode-electrolyte interface.

Once the capacitor is activated, at a next operation 202, the capacitor can be brought into electric communication with an electrical load and/or a power source. For example, a terminal of the first electrode and a terminal of the second electrode and the electrical load and/or the power source can be electrically connected to a same circuit (e.g., via conducting wires). Next 203, the capacitor can be charged or discharged via the electrical load and/or the power source. In some instances, the capacitor can be electrically connected to a power source that charges the capacitor. For example, the power source can be an alternate energy storage system (e.g., batteries) or a power supplier. In other instances, the capacitor can be electrically connected to an electrical load which consumes electrical power and discharges the capacitor.

Figure 3:
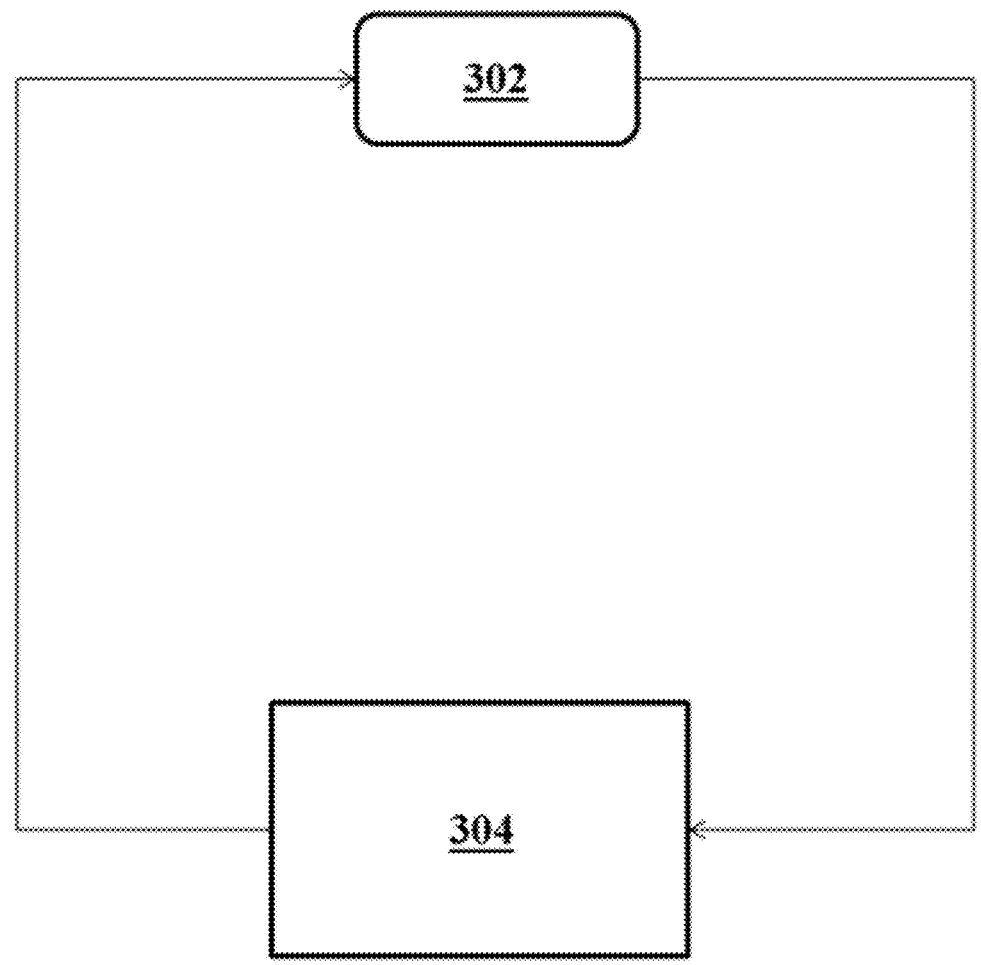
FIG. 3 shows a schematic diagram of a capacitor in electronic communication with an electrical load.

FIG. 3 shows a schematic diagram of a capacitor 304 in electric communication with an electrical load 302. In some instances, a first electronic component (e.g., capacitor, electrical load, etc.) can be in electric communication with a second electronic component when the first and second electronic components are components of a same electric circuit. The electrical load 302 can be a power grid or an electrical circuit of a vehicle, airplane, jet, train, railcar, boat, electronic device, power grid, smart grid, or another device that is capable of consuming or generating electric power. Examples of vehicles include gas cars, electric cars, hybrid gas/electric vehicles, motorboats, or other electric or non-electric vehicles. The electronic device may be a personal computer (e.g., portable PC, desktop PC, etc.), slate or tablet PC (e.g., Apple® iPad, Samsung® Galaxy Tab, etc.), telephone, Smart phone (e.g., Apple® iPhone, Android-enabled device, Blackberry®, etc.), or personal digital assistant. By way of example, the capacitor 304 may be used to power electrical loads that require short but powerful bursts of power, such as starting an engine, braking, and/or providing an acceleration in a wheel of a vehicle or other transportation unit (e.g., plane). For example, a plane in electrical communication with the capacitor 304 may receive a sufficient burst of power to accelerate its wheels during and/or near takeoff, such as to shorten runway lengths required for takeoffs.

The capacitor 304 can be used to power various high-processing and -computing systems. For example, computing systems applied towards any heavy processing work, such as blockchain mining systems (e.g., for cryptocurrency tokens, etc.), artificial intelligence systems, quantum systems, machine learning systems, cryptography systems (including any method of decryption), network operating systems, high definition graphics system, or other large systems may be powered by capacitors of the present disclosure. Alternatively or in addition, the capacitor may be used to significantly cool down the above systems and prevent overheating.

The capacitor 304 can be used to power various horizontal take-off and landing (HOTOL) or vertical take-off and landing (VTOL) aircraft systems. For example, rotors, proprotors, and propellers that are used for takeoff, flight, or landing may be powered by capacitors of the present disclosure. The rotors, proprotors, or propellers may be electric or hybrid gas/electric. A HOTOL aircraft system may be a distributed electric propulsion system. A VTOL aircraft system may be an unmanned aerial vehicle (UAV), such as a drone. The UAV may be flown remotely using radio frequencies by a pilot in a remote location, or fly autonomously following a pre-programmed flight. The aircraft systems powered by the capacitor 304 may be used as transport systems to carry at least one passenger, a cargo, or both.

The capacitor 304 can be incorporated into wearable textiles as wearable energy storage. In some instances, bast or hurd material or its derivatives (e.g. carbon nanosheets) can be integrated as part of a dielectric material in a two-dimensional supercapacitor with high aspect ratio (e.g. wire, yarn, etc.). The two-dimensional supercapacitor may be flexible. The two-dimensional supercapacitor may be woven into wearable textiles as wearable energy storage to power and/or charge various computing systems or electronic devices. The wearable textiles may include gloves, socks, shirts, ties, belts, and military vests. The various computing systems or electric devices may be a part of the wearable textiles (e.g. temperature sensors, heaters, light emitting diode displays, heart rate monitors, fitness trackers, etc.) or a separate portable device (e.g. mobile devices, smart watches, smart glasses, fitness trackers, etc.). The two-dimensional supercapacitors may be a micro-supercapacitor having a cross-sectional dimension of at least 0.1, 1, 10, 100, 1000 micrometers or more. The two dimensional supercapacitors may be, but are not limited to, a hierarchically structured composition of a conducting material and the bast material or its derivatives. The hierarchically structure composition may be a layer-by-layer (LBL) assembly. In an example, a two-layer membrane including a conducting layer including at least one conducting polymer and a dielectric layer including at least the bast and/or hurd material, or its derivatives, may be rolled into a two-dimensional supercapacitor yarn. An actuator may be used to roll the two-layer membrane into a two-dimensional supercapacitor yarn. The dielectric layer may include mast fibers that are aligned along a length of the two-dimensional supercapacitor yarn. The dielectric layer may further comprise liquid or solid electrolytes and/or a separator. The dielectric layer may contain favorable degrees of microporosity and/or mesoporosity of air as the separator. The two-dimensional supercapacitor yarn may comprise multiple LBL assemblies of the conducting layer and the dielectric layer. The two-dimensional supercapacitor yarn may have at least about 2, 3, 4, 5, 6, 7, 8, 9, 10, 20, 30, 40, 50, 100 or more LBL assemblies of the conducting layer and the dielectric layer.

In some instances, the capacitor 304 can be integrated as part of a power grid or smart grid for a region as large as a city or a plurality of cities. In some instances, the electrical load 302 can be an alternative and/or renewable energy harvesting or storage systems, such as but not limited to, solar power, wind power, hydro power, geothermal power, and gravity-assisted power generation systems. In some instances, the capacitor 304 may act as power buffers for the energy harvesting or storage systems.

In some instances, the same electrical load (e.g., vehicle, energy harvesting or storage system, etc.) can both charge and discharge the capacitor, such as for different applications of the electrical load. In some instances, a first electrical load can charge the capacitor and a second electrical load can discharge the capacitor. The circuit comprising the capacitor 304 and the electrical load 302 can comprise other electric components (e.g., switches, transistors, regulators, etc.) to facilitate the electric communication between the capacitor 304 and the electrical load 302. In some instances, the capacitor 304 can be in electric communication with a plurality of electrical loads. In some instances, the electrical load 302 can be in electric communication with a plurality of capacitors 304 which are connected consecutively in series, consecutively in parallel, and/or non-consecutively. In some instances, a circuit may comprise a plurality of capacitors and a plurality of electrical loads. In some instances, a circuit may comprise a plurality of power sources (e.g., fuel cell, batteries, other capacitors, etc.) including the capacitor 304. The circuit architecture for any circuit described above or further below is not limited to the one shown in the schematic diagram of FIG. 3.

A capacitor comprising bast fiber, bast powder, hurd, or a derivative thereof can be capable of charging or discharging power at a temperature of at least about −100° C., −50° C., −40° C., −30° C., −20° C., −10° C., 0° C., 10° C., 20° C., 30° C., 40° C., 50° C., 60° C., 70° C., 80° C., 90° C., 100° C., 110° C., 120° C., 130° C., 140° C., 150° C., 200° C., 250° C., 300° C., 350° C., or higher. As an alternative, the capacitor can be capable of charging or discharging power at a temperature less than or equal to 350° C., 300° C., 250° C., 200° C., 150° C., 100° C., 90° C., 80° C., 70° C., 60° C., 50° C., 40° C., 30° C., 20° C., 10° C., 0° C., −10° C., −20° C., −30° C., −40° C., −50° C., −100° C. or lower. In some instances, the capacitor can be capable of charging or discharging power at a temperature range, such as between about 60-100° C. For example, below a certain temperature, a rate of charge and/or discharge can be limited. For example, above a certain temperature, the capacitor can become unstable (e.g., due to thermal stability, flammability of the electrode material and/or dielectric material). In some instances, the capacitor can have better performance (e.g., higher power density, higher energy density, etc.) at a certain temperature range (e.g., 60-100° C.) than another temperature range.

In some instances, for a temperature range of about 60-100° C., the capacitor can be configured to have a power density of at least about 55 kilowatts per kilogram (kW/kg)

of active mass. A relatively higher power density can allow the capacitor to recharge and/or supply an amount of electrical energy in a relatively shorter period of time. Alternatively, the capacitor can have a power density of at least about 1 kW/kg, 5 kW/kg, 10 kW/kg, 15 kW/kg, 20 kW/kg, 25 kW/kg, 50 kW/kg, 55 kW/kg, 60 kW/kg, 65 kW/kg, 70 kW/kg, 75 kW/kg, 80 kW/kg, 85 kW/kg, 90 kW/kg, 95 kW/kg, 100 kW/kg, 110 kW/kg, 120 kW/kg, 130 kW/kg, 140 kW/kg, 150 kW/kg, 200 kW/kg, 250 kW/kg, 300 kW/kg, 350 kW/kg, 400 kW/kg, or higher. In some instances, the capacitor can have a higher power density at a certain temperature range than another temperature range.

In some instances, for a temperature range of about 60-100° C., the capacitor can be configured to have an energy density of at least about 40 watt hours per kilogram (Wh/kg) of active mass. A relatively higher energy density can allow the capacitor to store a relatively higher amount of energy in a fixed amount of active mass (e.g., per capacitor). Alternatively, the capacitor can have an energy density of at least about 1 Wh/kg, 5 Wh/kg, 10 Wh/kg, 15 Wh/kg, 20 Wh/kg, 25 Wh/kg, 50 Wh/kg, 55 Wh/kg, 60 Wh/kg, 65 Wh/kg, 70 Wh/kg, 75 Wh/kg, 80 Wh/kg, 85 Wh/kg, 90 Wh/kg, 95 Wh/kg, 100 Wh/kg, 110 Wh/kg, 120 Wh/kg, 130 Wh/kg, 140 Wh/kg, 150 Wh/kg, 200 Wh/kg, 250 Wh/kg, 300 Wh/kg, 350 Wh/kg, 400 Wh/kg, or higher. Such energy density may be over at least about 10, 25, 50, 75, 100, 110, 120, 130, 140, 150, 160, 170, 180, 190, 200, 210, 220, 230, 240, 250, 260, 270, 280, 290, 300, 350, 400, 450, 500, 600, 700, 800, 900, 1000, 1100, 1200, 1300, 1400, 1500, 1600, 1700, 1800, 1900, 2000, or more charge/discharge cycles of the capacitor. In some instances, the capacitor can have a higher energy density at a certain temperature range than another temperature range.

In some instances, for a temperature range of about 60-100° C., the capacitor can be configured to withstand at least about 250 charge/discharge cycles while maintaining a power density of at least about 55 kW/kg active mass and/or an energy density of at least about 40 Wh/kg active mass. The more charge/discharge cycles a capacitor can withstand, the longer the capacitor can remain in the circuit without need for replacing. Alternatively, the capacitor can maintain a power density of at least about 55 kW/kg active mass and/or an energy density of at least about 40 Wh/kg active mass over at least about 10, 25, 50, 75, 100, 110, 120, 130, 140, 150, 160, 170, 180, 190, 200, 210, 220, 230, 240, 250, 260, 270, 280, 290, 300, 350, 400, 450, 500, 600, 700, 800, 900, 1000, 1100, 1200, 1300, 1400, 1500, 1600, 1700, 1800, 1900, 2000, or more charge/discharge cycles. Alternatively, the capacitor can maintain a power density of at least about 75 kW/kg active mass and/or an energy density of at least about 60 Wh/kg active mass over at least about 10, 25, 50, 75, 100, 110, 120, 130, 140, 150, 160, 170, 180, 190, 200, 210, 220, 230, 240, 250, 260, 270, 280, 290, 300, 350, 400, 450, 500, 600, 700, 800, 900, 1000, 1100, 1200, 1300, 1400, 1500, 1600, 1700, 1800, 1900, 2000, or more charge/discharge cycles. Alternatively, the capacitor can maintain a power density of at least about 100 kW/kg active mass and/or an energy density of at least about 80 Wh/kg active mass over at least about 10, 25, 50, 75, 100, 110, 120, 130, 140, 150, 160, 170, 180, 190, 200, 210, 220, 230, 240, 250, 260, 270, 280, 290, 300, 350, 400, 450, 500, 600, 700, 800, 900, 1000, 1100, 1200, 1300, 1400, 1500, 1600, 1700, 1800, 1900, 2000, or more charge/discharge cycles. In some instances, the capacitor can withstand more charge/discharge cycles at a certain temperature range than another temperature range.

In some instances, for a temperature range of about 60-100° C., the capacitor can be configured to have a charge and/or discharge time of less than about 10 seconds. Alternatively, the capacitor can have a charge/discharge time of at most about 60, 55, 50, 45, 40, 35, 30, 25, 20, 15, 10, 9, 8, 7, 6, 5, 4, 3, 2, 1, 0.1, 0.01, or shorter. In some instances, the capacitor can have a higher energy density at a certain temperature range than another temperature range.

One or more components of the capacitor described herein, such as an electrode or dielectric material comprising bast fiber, bast powder, hurd, or a derivative thereof, may be used as components for other power or energy storage systems, such as batteries (e.g., solid state batteries), fuel cells, electrochemical cells, rechargeable cells (e.g., secondary cells) or other storage systems. For example, a battery may comprise one or more electrodes comprising bast fiber, bast powder, hurd, or a derivative thereof, such as the electrodes described elsewhere herein for use in a capacitor. The bast fiber, bast powder, hurd, or a derivative thereof may be the active material for the electrodes. In some instances, the battery may comprise one electrode comprising bast fiber, bast powder, hurd, or a derivative thereof. In some instances, the battery may comprise two electrodes each comprising the same or different compositions of bast fiber, bast powder, hurd, or a derivative thereof. A power or energy storage system may comprise other plant-derived material (e.g., hemp-derived, flax-derived, etc.).

EXAMPLE

In an example, electrodes for use in capacitors are formed by carbonizing and activating a hydrothermal product of hemp bast fiber. Hemp bast fiber and diluted sulfuric acid are sealed inside a steel autoclave. The autoclave is heated at 180° C. for 24 hours and then allowed to cool to room temperature (e.g., about 20-25° C.). The contents in the autoclave are filtered, washed with distilled water, and dried to yield a carbonaceous solid (e.g., biochar). The biochar and potassium hydroxide (KOH) are mixed at a 1:1 mass ratio and the mixture is heated at 700-800° C. (e.g., at 3° C./min) for 1 hour under argon flow. The activated sample is then washed with 10 weight % (wt %) hydrochloric acid (HCl) and distilled water. The carbons are dried in an oven at 100° C. for 12 hours. Carbon nanosheet activated at 700° C. (CNS-700) through the above process has a surface area density of 1690 square meters per gram ($m^2g^{-1}$), carbon nanosheet activated at 750° C. (CNS-750) through the above process has a surface area density of 2287 $m^2g^{-1}$, and carbon nanosheet activated at 800° C. (CNS-800) through the above process has a surface area density of 1505 $m^2g^{-1}$. The electrical conductivity for CNS-700, CNS-750, and CNS-800 are 217 siemens per meter ($Sm^{-1}$), 211 $Sm^{-1}$, and 226 $Sm^{-1}$, respectively. At an operating temperature of 20° C., CNS-750 and CNS-800 exhibit an energy density of 19 watt hour per kilogram ($Whkg^{-1}$) and 18 $Whkg^{-1}$, respectively. At an operating temperature of 60° C., CNS-750 and CNS-800 exhibit an energy density of 34 $Whkg^{-1}$ and 31 $Whkg^{-1}$, respectively. At an operating temperature of 100° C., CNS-750 and CNS-800 exhibit an energy density of 40 $Whkg^{-1}$ and 34 $Whkg^{-1}$, respectively. The maximum power density for CNS-800 at the operating temperatures of 20° C., 60° C., and 100° C. is 28 kilowatts per kilogram ($kWkg^{-1}$), 49 $kWkg^{-1}$, and 77 $kWkg^{-1}$, respectively. The CNS-800 can retain 96% of the initial capacitance after 10,000 cycles.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A capacitor for storing electrical energy, comprising:
    a first electrode formed of a material configured to conduct electrons to or from an electrical load;
    a dielectric adjacent to said first electrode, wherein said dielectric comprises (i) a separator formed of a derivative of a bast or hurd material, wherein said derivative is stacked graphene-like carbon nanosheets and (ii) an electrolyte; and
    a second electrode adjacent to said dielectric, wherein said second electrode is formed of material that is configured to conduct electrons to or from said electrical load, wherein said separator is sufficient to induce an electrical potential to accumulate between said first electrode and said second electrode, and wherein said second electrode is electrically isolated from said first electrode,
    wherein said capacitor has a power density of at least about 55 kilowatts (kW)/kilograms (kg) active mass at a temperature from 60° C.-100° C. over at least about 250 charge/discharge cycles via said electrical load.

2. The capacitor of claim 1, wherein said capacitor has a power density of at least about 75 kW/kg active mass at said temperature from 60° C.-100° C. over at least about 250 charge/discharge cycles via said electrical load.

3. The capacitor of claim 2, wherein said capacitor has a power density of at least about 100 kW/kg active mass at said temperature from 60° C.-100° C. over at least about 250 charge/discharge cycles via said electrical load.

4. The capacitor of claim 1, wherein said capacitor has a power density of at least about 55 kW/kg active mass at said temperature from 60° C.-100° C. over at least about 500 charge/discharge cycles via said electrical load.

5. The capacitor of claim 4, wherein said capacitor has a power density of at least about 55 kW/kg active mass at said temperature from 60° C.-100° C. over at least about 2000 charge/discharge cycles via said electrical load.

6. The capacitor of claim 1, wherein said dielectric comprises a derivative of a hurd material.

7. The capacitor of claim 1, wherein said capacitor has a mass of at most about 5 kg.

8. The capacitor of claim 1, wherein said capacitor has a mass of at most about 2 kg.

9. The capacitor of claim 1, wherein said capacitor has an energy density of at least about 40 W hours (h)/kg active mass at a temperature from 60° C.-100° C. over at least about 250 charge/discharge cycles via said electrical load.

10. The capacitor of claim 9, wherein said capacitor has an energy density of at least about 60 W h/kg active mass at a temperature from 60° C.-100° C. over at least about 250 charge/discharge cycles via said electrical load.

11. The capacitor of claim 1, wherein the bast or hurd material is (i) bast or hurd fiber or (ii) bast or hurd powder.

12. A method for storing electrical energy, comprising:
    (a) activating a capacitor comprising (i) a first electrode formed of a material configured to conduct electrons to or from an electrical load; (ii) a dielectric adjacent to said first electrode, wherein said dielectric comprises (i) a separator formed of a derivative of a bast or hurd material, wherein said derivative is stacked graphene-like carbon nanosheets and (ii) an electrolyte; and (iii) a second electrode adjacent to said dielectric, wherein said second electrode is formed of material that is configured to conduct electrons to or from said electrical load, wherein said separator is sufficient to induce an electrical potential to accumulate between said first electrode and said second electrode, and wherein said second electrode is electrically isolated from said first electrode, wherein said capacitor has a power density of at least about 55 kilowatts (kW)/kilogram (kg) active mass at a temperature from 60° C.-100° C. over at least about 250 charge/discharge cycles;
    (b) bringing said capacitor in electrical communication with said electrical load; and
    (c) charging or discharging said capacitor via said electrical load.

13. The method of claim 12, wherein said electrical load is a power grid.

14. The method of claim 12, wherein said electrical load comprises an electrical circuit of a vehicle.

15. The method of claim 12, wherein said electrical load comprises an electrical circuit of an airplane or a boat.

16. The method of claim 12, wherein said electrical load comprises an electrical circuit of a train.

* * * * *